United States Patent [19]

Frosch

[11] 4,278,351
[45] Jul. 14, 1981

[54] INTERFEROMETER

[76] Inventors: Robert A. Frosch, Administrator of the National Aeronautics and Space Administration, with respect to an invention of James B. Breckinridge, Robert H. Norton, both of La Canada; Rudolf A. Schindler, Sierra Madre, all of Calif.

[21] Appl. No.: 37,560

[22] Filed: May 9, 1979

[51] Int. Cl.³ .............................................. G01B 9/02
[52] U.S. Cl. ..................................... 356/345; 356/346
[58] Field of Search ........................ 356/345, 346, 361

[56] References Cited

U.S. PATENT DOCUMENTS

| | | | |
|---|---|---|---|
| 2,795,991 | 6/1957 | Tuzi | 356/361 |
| 3,419,331 | 12/1968 | Diehr | 356/345 |
| 3,809,481 | 5/1974 | Schindler | 356/346 |
| 4,181,440 | 1/1980 | Schindler | 356/346 |
| 4,193,693 | 3/1980 | Schindler | 356/346 |

*Primary Examiner*—John K. Corbin
*Assistant Examiner*—Matthew W. Koren
*Attorney, Agent, or Firm*—Monte F. Mott; John R. Manning; Paul F. McCaul

[57] ABSTRACT

A high resolution interferometer is provided which is insensitive to slight misalignment of its elements, avoids channeling in the spectrum, generates a maximum equal path fringe contrast, produces an even two-sided interferogram without critical matching of the wedge angles of the beamsplitter and compensator wedges, and is optically phase tunable. The interferometer includes a mirror along the path of each beam component produced by the beamsplitter, for reflecting the beam component from the beamsplitter to a corresponding retroreflector and for reflecting the beam returned by the retroreflector back to the beamsplitter. The fact that the mirror "covers" the retroreflector, so that the mirror reflects the beam component before and after it reaches the retroreflector, results in the system being insensitive to slight tilting of the mirror. A wedge located along each beam component path, is large enough to "cover" the retroreflector, so that each beam component passes through the wedge during movement towards the retroreflector and away therefrom, to assure that all portions of a beam component pass through the same thickness of glass of the wedge.

12 Claims, 9 Drawing Figures

INTERFEROMETER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

A basic Michelson interferometer is sensitive to even very slight misalignment of optical elements. Such misalignment causes the two beam components to not overlap and therefore not produce a maximum fringe contrast when they move along equal path lengths. In interferometers utilized for spectral analysis, wedges can be utilized to vary the path length of different beam components, and also as the beamsplitter layer support to avoid channeling effects from beam components passing through the beamsplitter. However, where a wide beam passes through a wedge, different portions of the beam pass through different thicknesses of the glass or other wedge material, and the differences depend upon the exact rotational or lateral position of the wedge. Another problem encountered in the use of interferometers, is that polarization effects can occur, which are deleterious when there are reflections at a large angle to a mirror surface, such as more than 45° from the normal, since differently polarized light may be reflected in different amounts in such reflections. These polarization effects reduce the maximum fringe contrast and hence the instrument efficiency. An interferometer system which was insensitive to slight tilting of its optical elements, was insensitive to rotation of wedges, was optical dispersion-phase-tunable across the wavefront without accurate wedge angle matching, avoided polarization effects, and introduced no channeling in the spectra, would be of considerable value.

SUMMARY OF THE INVENTION

In accordance with one embodiment of the present invention, an interferometer is provided which avoids adverse effects from slight misalignment and which can produce a high fringe contrast. The interferometer includes a mirror arrangement for directing each beam component received from a beamsplitter along a path that extends through a retroreflector and later back to the beamsplitter for recombination. Each mirror arrangement includes a flat mirror which reflects a corresponding beam component both in its travel towards the retroreflector and in its return from the retroreflector, so that the system is compensated for slight tilting of the mirror. A wedge is located along the path of each beam component, with each wedge positioned so that the beam component passes through the wedge during movement toward the retroreflector and in movement away from the retroreflector, so that all sides of a beam component pass through the same thickness of wedge material.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
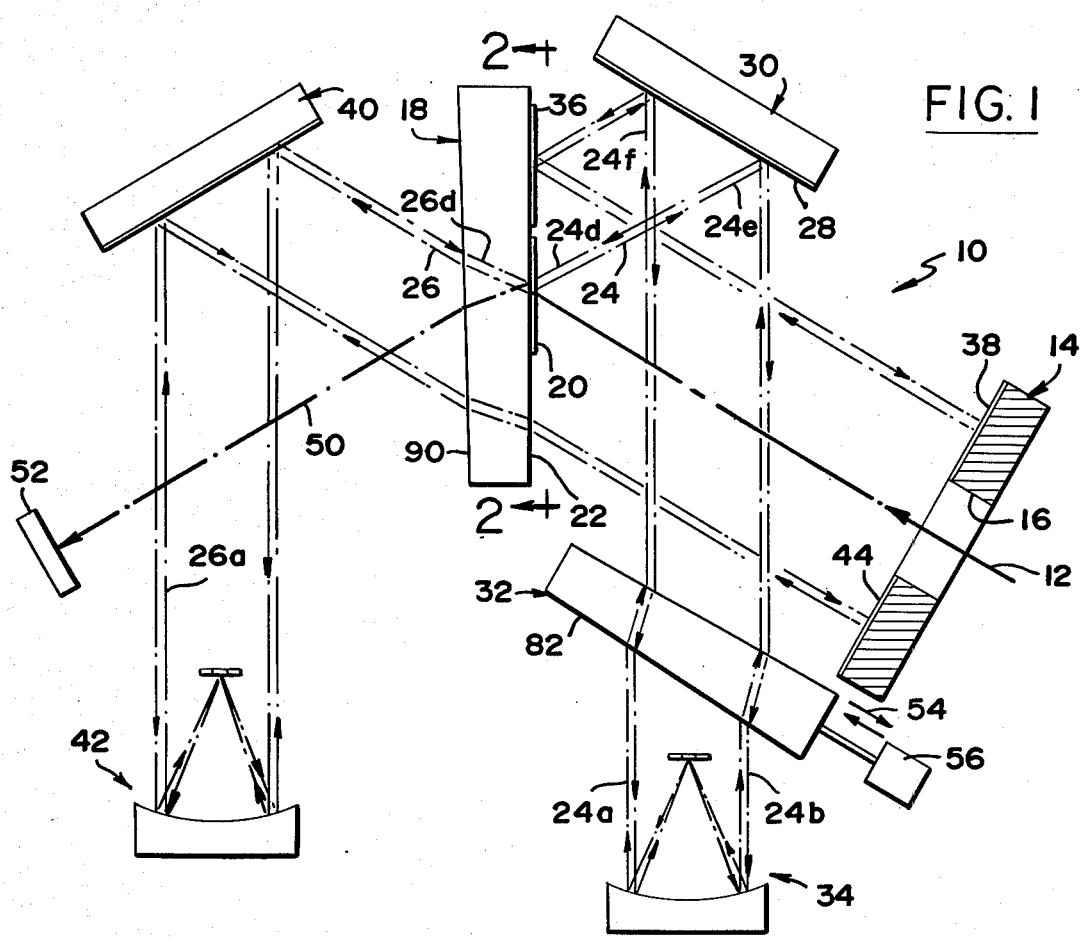
FIG. 1 is a simplified side elevation view of an interferometer constructed in accordance with the present invention.

FIG. 1 illustrates an interferometer 10 which can be utilized to perform spectral analysis of a collimated beam 12. The interferometer includes a mirror 14 with a hole 16 therein which may be at its center, for passing the incoming beam 12, and a wedge 18 with a beamsplitter coating 20 on a surface 22 thereof for dividing the incoming beam into a pair of beam components 24, 26. One of the components 24 that is reflected from the beamsplitter coating, or beamsplitter, 20 is thereafter reflected from the mirrored surface 28 of a mirror 30, through a different wedge 32, to a cat's eye retroreflector 34. The retroreflector 34 produces a return beam component 24a which is parallel to but offset from the incoming beam component 24b. The returned beam component passes through the wedge 32 and is reflected from the mirror 30 towards a mirror coating 36 that is located on the surface 22 of the wedge 18. The reflective coating or mirror 36 reflects the beam component against a mirror region 38 of the mirror 14. The beam component reflected from the mirror region 38, retraces its path against the mirrors 36, 30 through the wedge 32 to retroreflector 34, through the wedge 32 to the mirror 30, and back to the beamsplitter at 20. This return beam is shown as offset at 24d, only for clarity, the beams actually being coincident.

The other beam component 26 initially produced at the beamsplitter 20, passes through the wedge 18, is reflected by a mirror 40 to another retroreflector 42, and is returned by the retroreflector as the beam component at 26a. The beam component at 26a is reflected from the mirror 40, passes through the wedge 18, and reaches another mirror region 44 of the mirror 14. The mirror region 44 returns the beam component along its path through the wedge 18, against the mirror 40, through the retroreflector 42, again to the mirror 40, and again through the wedge 18 to reach the beamsplitter 20. The two beam components at 24d, 26d are recombined by the beamsplitter 20 to emerge as an outgoing combined beam 50 that is directed against a detector 52.

If the two beam components 24, 26 move along air paths of equal length, and along paths within the wedges 18, 32 which are also of equal length, then a bull's eye interference pattern will be produced on the detector 52. In an interferometer utilized to measure distances, one of the retroreflectors such as 34 or 42 may be moved and the changes in the interference pattern observed to detect such movement. In an interferometer utilized for spectral analysis, it is sometimes required that the optical path difference in each arm (i.e. for each beam component path which is different from that of the other component) be the same at all wavelengths or colors. To accomplish this, one of the wedges such as 32 may be moved, as in the direction of arrow 54 by a positioning device 56, to create a slight difference in the path length of one of the beam components in the glass or other material of the wedge 32, to produce a change in the interference pattern. The spectral components of the incoming beam are analyzed by scanning either retroreflector 42 or 34 or both, (e.g. by translating the retroreflector 34 up or down in FIG. 1). The interferometer 10 which is illustrated is especially adapted for spectral analysis.

The mirrors 30, 40 which direct each beam component emerging from the beamsplitter onto a corresponding retroreflector 34, 42 are provided to enable a more compact interferometer to be designed. It would be possible to eliminate these mirrors 30, 40 and position the retroreflectors 34, 42 to directly intercept the beams from the beamsplitter, but this would add considerably to the overall dimensions of the interferometer. The provision of additional mirrors 30, 40 could have the adverse effect of increasing the tilt sensitivity of the system, since the two beam components must be combined so that they are precisely aligned with one another and any tilting of a mirror could shift the position of a beam component. However, the combination of a cat's eye retroreflector such as 34 and the mirror 30 which completely "covers" the cat's eye retroreflector, avoids high mirror tilt sensitivity.

The tilt insensitivity of the mirrors 30, 40 is due to their reflection of beam components both when approaching the retroreflectors and when returned therefrom. When a beam component such as at 24e is reflected off the mirror 30, any tilting of the mirror will direct the beam at a slight angle from the optimum direction. However, the retroreflector 34 reverses the orientation of the beam, so that the beam component at 24f returned by the retroreflector to the mirror 30 will undergo a reverse tilting when it is reflected from the mirror 30. These two reflections, of the beam components at 24e and 24f result in cancellation of any slight tilting of the mirror 30. In a similar manner, the beam component after return by the mirror region 38 of mirror 14, undergoes two reflections off the mirror 30, with the cat's eye 34 reversing the orientation of the beam component between the two reflections, to again cancel the effects of any slight tilting of the mirror 30. As a result, slight tilting of the mirror 30 does not change the angular orientation of the beam component at 24d which is combined with the other beam component, but only effects a very slight shift of the beam component at 24d. As a result, tilting of the mirror 30 by seconds of arc causes no appreciable effect, and only tilting in excess of on the order of 10 minutes of arc produces an appreciable effect on the interference pattern at the detector 52.

Figure 3:
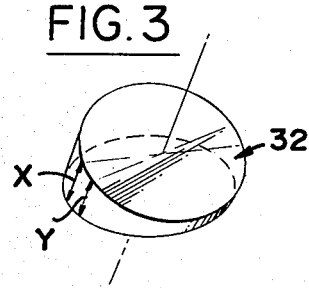
FIG. 3 is a perspective view of one of the wedges of FIG. 1, showing how the rotational position of a wedge can affect the thickness of wedge material through which a beam passes.

In the use of the spectrometer 10 for spectro-analysis of an incoming beam 12, it is often desirable to initially utilize the system so that the beam components 24, 26 pass through precisely the same thicknesses of glass of the two wedges 18, 32. Due to the appreciable width of the incoming beam 12, it would be possible for different sides of the beams to pass through different thicknesses of the wedge material. To assure that both beam components interact similarly with their wedges, it then would be necessary for the two wedges 18, 32 to be formed with precisely the same wedge angles. Also, even if the two wedges 18, 32 were formed with precisely the same wedge angle, it would be necessary that the rotational and lateral positions along arrow 54, of the wedges be very closely controlled. FIG. 3 shows how the thickness through a wedge changes, such as from thickness X to thickness Y, when the wedge rotates slightly.

Figure 4:
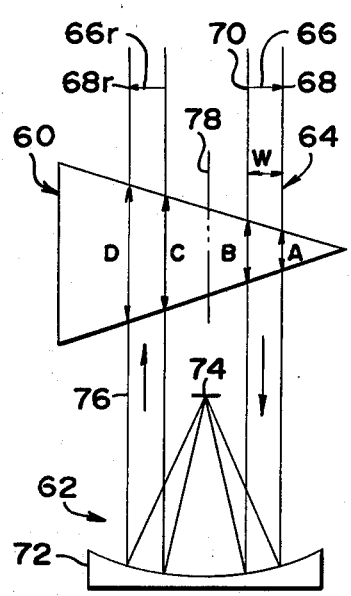
FIG. 4 is a representational view, showing how the system of FIG. 1 is compensated for rotation of the wedge of FIG. 3.

Each wedge such as 32 (FIG. 1) is positioned so it "covers" a corresponding retroreflector 34, to intercept both the incoming and returned beam components 24b, 24a. As a result, the thickness of glass or other wedge material through which a beam component such as 24 passes (to balance that passed by the other) is made independent of the angle of the wedge and the rotational orientation of the wedge about the axis of one of its surfaces. FIG. 4 shows how a system containing a wedge 60, becomes insensitive to the wedge angle and wedge rotational position, when the wedge is utilized to cover a retroreflector 62. An incoming beam 64 of appreciable width is shown, which represents an arrow at 66 that has a head 68 at one side of the beam and a tail 70 at the other side. This beam 64 is reflected off the concave mirror 72 of the cat's eye retroreflector 62, off the secondary mirror 74, and again off the primary mirror 72, to produce a return beam 76. The retroreflector 62 reverses the orientation of the beam, so that the arrow at 66r in the return beam, is oriented with its head at 68r facing in the opposite direction to the head 68 of the incoming beam.

In the apparatus of FIG. 4, all portions of the incoming beam 64 pass through precisely the same thickness of the glass material of the wedge 60. (That amount of thickness is adjusted by shearing movement of the wedge over the cat's-eye retroreflector.) The head 68 of the arrow passes through the thickness A of wedge material during movement towards the retroreflector and passes through the distance D of wedge material along the return path. The tail 70 of the arrow passes through the thickness B of wedge material during passage towards the retroreflector, and passes through the thickness C of wedge material during its return. From simple geometrical considerations, it can be shown that the distance A+D of the head equals the distance B+C of the tail. The same equality exists for all portions of the arrow 66. Thus, the thickness of wedge material through which the beam component passes in movement towards and away from the retroreflector, equals twice the thickness of the wedge as measured along the axis 78 of the retroreflector. The path length through wedge material can be equalized for the two wedges 18, 32 of the interferometer 10 of FIG. 1, by shifting one of the wedges such as 32 along arrow 52. It is not necessary to very closely control the orientation of the wedges or match the angles of the two wedges. It may be noted that the actual wedge angle, which is the maximum angle between lines on the surfaces such as 80, 82 of the wedge 32 of FIG. 1, is typically about 0.3°, a larger angle being shown in the figure to aid in understanding of the system. It may be noted that one of the wedges can have parallel faces, so that its function is to provide a path length in glass for a beam component, to match the glass path length of the other wedge which has angled faces. However, the use of parallel faces requires other means to avoid ghost reflections or at least minimize adverse effects from them. The term "wedge," is used to refer to a largely plate like and transparent element for transmitting a light beam.

Figures 4A, 4B:
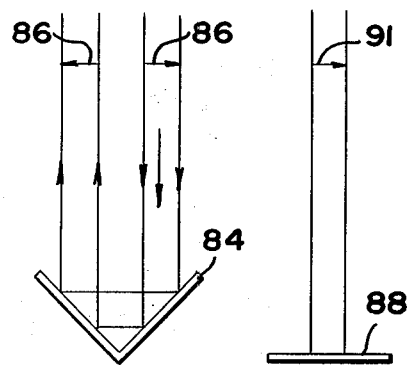
FIG. 4A shows another retroreflector which can be utilized in the system of FIG. 1.
FIG. 4B shows the manner of reflection of a beam from a flat mirror.

Although a cat's eye retroreflector is utilized in FIG. 1, other retroreflectors can be utilized, such as a corner retroreflector shown at 84 in FIG. 4A. The corner retroreflector 84 is also of the reversing type, in that an arrow 86 represented by an incoming beam is reversed in orientation at 86r along the returned beam from the retroreflector. It may be noted that this reversing phenomenon is not present in all reflectors. For example, FIG. 4B shows a flat mirror 88 which receives a beam representing an arrow 91, and with the returned beam having the same orientation as the incoming beam, rather than the orientation being reversed. If a mirror such as 88 were utilized in place of the retroreflector 34 in FIG. 1, then different portions of the beam component would pass through different thicknesses of wedge material, and the two wedges 18, 32 would have to be precisely matched in construction and orientation. Also, if such a mirror were utilized, a mirror such as 30 utilized along the beam component path, would be highly tilt sensitive.

One of the problems that can arise in an interferometer, is uneven reflection of differently polarized portions of the light. This is reduced in the system of FIG. 1, by orienting all reflecting surfaces so that all reflections are made at fairly close to the normal direction to each reflective surface. The reflectivity and transmissivity of surfaces is polarization dependent, and becomes more dependent as the incidence angle increases. It is found that reflection angles (as measured from lines normal to the reflecting surface) of more than about 30° result in uneven reflections of light portions of different polarization directions, with reflections at 45° to the normal resulting in appreciable differences. In the system of FIG. 1, all reflections are held to no more than about 30°, to avoid such unevenness. It may be noted that polarization-based unevenness of reflection can be detected by sensitive instruments at angles as low as 20°, but the effects become large enough to seriously impair the efficiency (amount of fringe contrast) of the interferometer at larger angles such as above 30°.

Figure 2:
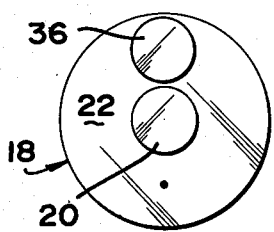
FIG. 2 is a view taken on the line 2—2 of FIG. 1.

The wedge 18 shown in FIGS. 1 and 2, is constructed with both the beamsplitter coating 20 and mirror coating 36 formed on the same surface 22 of the wedge. This minimizes the number of very accurate surfaces that must be formed on the wedge 18. Both the beamsplitter 20 and reflector 36 must be formed accurately flat and parallel, so that the surface 22 on which they rest must be formed flat to perhaps one quarter wavelength. By placing the beamsplitter and reflector on the same surface 22, the other surface 90 of the wedge can be formed to much larger tolerances, such as to within one wavelength of flatness rather than one quarter wavelength. Of course, the positioning of the beamsplitter 20 and mirror 36 on the wedge results in a fewer number of separately movable parts whose relative alignment must be accurately maintained.

Figure 5:
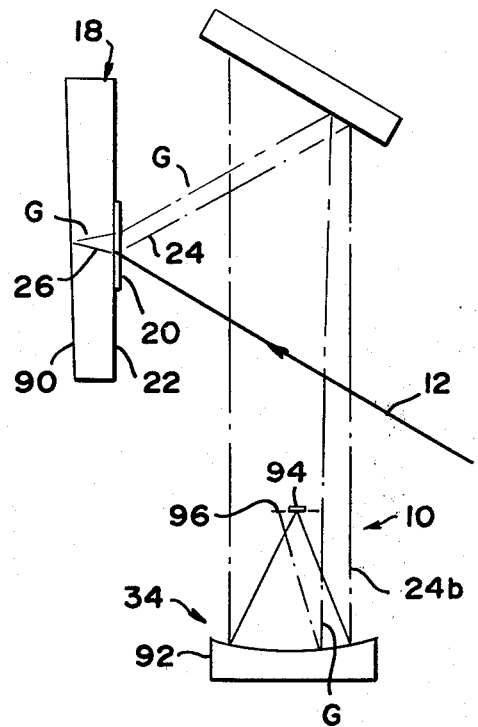
FIG. 5 is a representational view of a portion of the interferometer of FIG. 1, showing how it avoids channeling effects.

The use of the wedges 18, 32 enables the elimination of "ghost" images. FIG. 5 shows a portion of the interferometer of FIG. 1, and indicates the manner in which a ghost reflection G may be generated, as a reflection of the beam component 26 at the glass-air interface formed at the surface 90 of the wedge 18. If the two surfaces 22, 90 of the wedge 18 were parallel, then the beam component 24 and the ghost reflection G would pass along parallel paths throughout the entire path of the beam component 24, so that the ghost G would reach the detector. By angling the wedge surface 90 from the beamsplitter 20 which lies on the surface 22, the ghost reflection G extends at a slightly different angle than the beam component 24. As a result, when the ghost reflection reaches the primary mirror 92 of the retroreflector 34, it is oriented at a slightly different angle than the beam component at 24b. While the beam component 24b is reflected to the center of the secondary mirror 94 of the retroreflector, the ghost reflection G is reflected to one side of the secondary mirror, and against a mask 96 that surrounds the secondary mirror 94. As a result, the ghost G is absorbed by the mask 96, and is not returned by the retroreflector. Thus, in a compact interferometer, where there is not sufficient room to direct the ghost reflection to one side of the mirror so as to dispose of it, the ghost reflection nevertheless can be eliminated by the use of a cat's eye retroreflector wherein a mask is utilized around the secondary of the cat's eye to absorb the ghost reflection.

Figure 6:
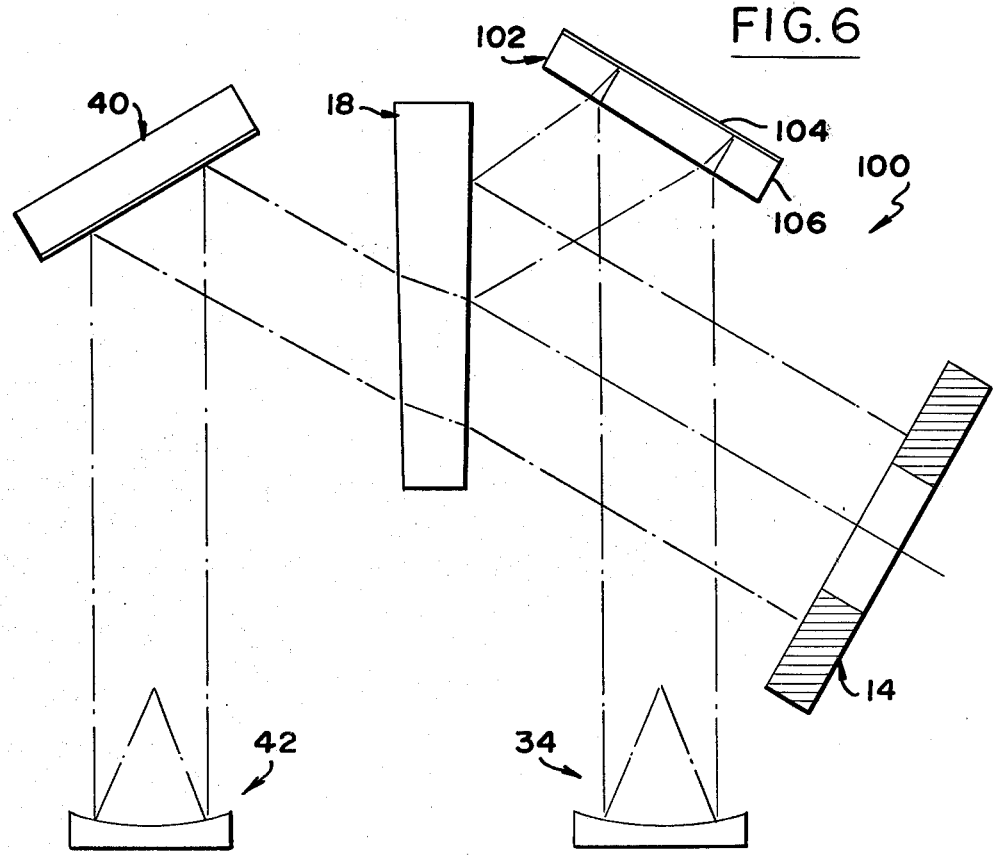
FIG. 6 is a simplified side view of an interferometer constructed in accordance with another embodiment of the invention.

FIG. 6 illustrates an interferometer 100 similar to that of FIG. 1, except that the mirror 30 and wedge 32 of FIG. 1 are replaced by a single wedge and mirror combination 102. In this combination element, a reflective coating 104 is formed on a far face of the wedge 106. This design reduces the number of optical elements and the number of air-glass (or other transparent material) interfaces.

Figure 7:
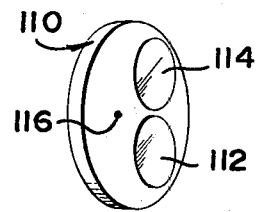
FIG. 7 is a perspective view of an optical element constructed in accordance with another embodiment of the invention for use in another interferometer system.

FIG. 7 illustrates a wedge 110 which has a beamsplitter 112 and mirror 114 formed as coatings thereon, which can be used in a system in place of the wedge 18 of FIGS. 1 and 2. In the wedge 110, the beamsplitter 112 and mirror 114 are spaced by 120° around the center axis of the wedge, and are spaced by 120° from a location 116 through which a beam component passes, which is comparable to the beam component 26 in its movement between the mirrors 40 and 44 of FIG. 1. Since the centers of the three locations, or the beamsplitter 112, mirror 114, and clear path 116, are not all arranged along a line, utilization of the wedge 110 will require the beam components to be diverted out of a common plane, as by tilting the mirror 40 and shifting the position of the corresponding retroreflector 42 in FIG. 1. The advantage of the wedge 110 is that it efficiently utilizes the area of a circular optical element, which is the element shape most easily manufactured.

Thus, the invention provides an interferometer which is relatively compact and tilt insensitive. In fact, the arrangement is not only tilt insensitive (the two beam components remain overlapped in spite of small optical element tilt) but is tilt compensated (the interference pattern formed by the overlapped beam components does not shift position). Tilt compensation for certain mirrors of the interferometer is achieved by the use of retroreflectors of the type that produce a returned beam which is reversed from the incoming beam, and by positioning the mirror to cover the retroreflector so that both the incoming and returned beam will be reflected from the mirror. In a similar manner, a pair of wedges through which different beam components pass, are made insensitive to matching of the wedge angles and orientation of the wedges, by positioning each wedge so it covers the corresponding retroreflector to assure that both the incoming and returned beams of the retroreflector pass through the corresponding wedge. The beamsplitter can be formed as a coating on one surface of one of the wedges, and further simplification can be achieved by forming a mirror coating on the same surface of the wedge as the beamsplitter. Removal of ghost reflections can be achieved by the use of a cat's eye retroreflector, wherein a mask is positioned around the center of the secondary mirror to absorb the ghost reflections.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. An interferometer comprising:
   first and second retroreflectors which return a beam reversed in orientation from the incoming beam;
   a beamsplitter for receiving a light beam directed along a predetermined input path, to split it into first and second beam components;
   means for directing each of said beam components along a corresponding path leading into a corresponding one of said retroreflectors, and for recombining beam components from said retroreflectors to form an interference pattern;
   said directing means including two mirror arrangements, each associated with one of said retroreflectors and each including at least one flat mirror positioned to direct a corresponding beam component leaving said beamsplitter to the corresponding retroreflector and to also reflect the beam component returned by the retroreflector, whereby to make the interferometer insensitive to slight tilting of the flat mirrors.

2. The interferometer described in claim 1 including:
   first and second wedges, each having a pair of flat faces angled from each other, and each wedge positioned to lie in the path of one of said beam components to intercept said component both when said component moves towards and when it moves away from the corresponding retroreflector, whereby to avoid different path length for different portions of a beam component, through optical material of said wedges.

3. The interferometer described in claim 2 wherein:
   said beamsplitter comprises a coating lying on a predetermined surface of one of said wedges.

4. The interferometer described in claim 3 wherein:
   one of said mirror arrangement includes a mirror coating lying on said predetermined wedge surface beside said beamsplitter coating.

5. The interferometer described in claim 1 including:
   a pair of wedges, each positioned along the path of one of said beam components; and wherein
   at least one of said retroreflectors is a cat's eye type which includes primary and secondary mirrors, with the primary mirror capable of focusing a collimated beam onto the secondary mirror, said cat's eye retroreflector including a light absorbing mask beside said secondary mirror.

6. The interferometer described in claim 1 wherein:
   all of the mirrors of said mirror arrangements are positioned so that all reflections of said light beam portins incident thereon are in the range of about 0° to 30° from a direction normal to the mirror surface.

7. In an interferometer which includes a pair of retroreflectors, a pair of wedges, and a beamsplitter for splitting a beam into a pair of beam components, and which is constructed so the beam components pass through the wedges and against the retroreflectors in paths that return the components to the beamsplitter to combine them, the improvement wherein:
   said beamsplitter comprises a coating lying on a surface of one of said wedges, and occupying only a portion of said surface, so that light can pass through said wedge in a path that does not lead through said beamsplitter coating.

8. The improvement described in claim 7 wherein:
   said interferometer includes a mirror positioned along the path of one of said beam components, said mirror comprising a reflective coating lying on said wedge surface beside said beamsplitter coating and occupying a portion of said wedge surface.

9. An interferometer comprising:
   a pair of flat mirror regions (44,38) with a space between them for passing an incoming light beam;
   a beamsplitter (20) positioned to receive an incoming beam passing between said mirror regions;
   a first retroreflector (42) which produces a return beam parallel to but displaced from an offcenter incoming beam;
   a first mirror (40) positioned to reflect the beam portion transmitted by said beamsplitter to said first retroreflector along a path off the center of the retroreflector, so that the beam portion is returned to the first mirror and reflected to one of said mirror regions (44) in a path spaced from the beamsplitter, and then returned via the first mirror and first retroreflector to the beamsplitter;
   a second retroreflector (34) which produces a return beam parallel to but displaced from an offcenter incoming beam;
   a second mirror (30) positioned to direct the beam portion reflected by the beamsplitter to said second retroreflector along a path off the center of the second retroreflector; and
   a third mirror (30) positioned to reflect the beam portion after it is retroreflected to said second mirror, toward a second of said mirror regions (38), for subsequent return by way of the third and second mirrors and second retroreflector to said beamsplitter, for recombining with the first beam portion.

10. The interferometer described in claim 9 including:
    first and second optical wedges, said first wedge located along the path of only said first beam portion and said second wedge located along the path of only said second beam portion, and each wedge positioned so that the corresponding beam portion passes therethrough in travel both toward and away from the corresponding retroreflector.

11. The interferometer described in claim 10 wherein:
    said second mirror comprises a reflecting coating on a surface of said second wedge, and covering a minority of said surface.

12. The interferometer described in claim 9 wherein:
    said beamsplitter and third mirror comprise coatings formed on portions of said first wedge.

* * * * *